United States Patent [19]

Del Ser Gonzalez

[11] 4,096,795
[45] Jun. 27, 1978

[54] OLIVE PITTING AND STUFFING MACHINE

[76] Inventor: Clemente Del Ser Gonzalez, Po.de Talleres 36, Villaverde Alto (Madrid), Spain

[21] Appl. No.: 712,320

[22] Filed: Aug. 6, 1976

Related U.S. Application Data

[63] Continuation-in-part of Ser. No. 701,942, Jul. 1, 1976, abandoned.

[30] Foreign Application Priority Data

Feb. 3, 1976 Spain .................................... 444888

[51] Int. Cl.² .............................................. A23N 4/08
[52] U.S. Cl. ...................................... 99/494; 99/546; 99/548; 99/561
[58] Field of Search .................. 99/538, 544, 547–548, 99/560–561, 565; 221/253, 264

[56] References Cited

U.S. PATENT DOCUMENTS

| | | | |
|---|---|---|---|
| 2,643,694 | 6/1953 | Ashlock | 99/494 |
| 2,821,223 | 1/1958 | Kagley | 99/561 |
| 2,991,813 | 7/1961 | Wilms | 99/548 |
| 3,139,916 | 7/1964 | Kagley | 99/548 |
| 3,253,739 | 5/1966 | Martin | 221/253 |
| 3,277,940 | 10/1966 | Henderson | 99/561 |
| 3,282,314 | 11/1966 | Cantoni | 99/548 |
| 3,773,615 | 9/1966 | Aquilar | 99/561 |

Primary Examiner—Harvey C. Hornsby
Assistant Examiner—Robert Pous
Attorney, Agent, or Firm—Huebner & Worrel

[57] ABSTRACT

An olive pitting and stuffing machine has a drum rotatable about an axis and provided with opposing pairs of clamping members angularly equispaced about the axis and respectively engageable with opposite ends of olives fed in succession generally tangentially to the drum. The drum also comprises respective tubular cutters axially aligned with each pair of clamping members and displaceable to cut an end out of the olive, a plunger axially aligned with each pair of clamping members on the opposite side of the drum adapted to pierce the olive through the other end and push out the olive pit, and a pimento inserter also aligned with the clamping members and effective to insert a folded piece of pimento as the stuffing in the interior of the olive. The plunger, cutter and pimento inserter all rotate together with the clamping members as part of the drum and with the respective olive and all are displaceable by engagement with respective circular stationary cams so that the entire sequence of operations takes place in less than a full revolution of the drum and without any interruption in the continuous movement of the olive from the point at which it is engaged by the clamping members to the point at which it is discharged from the drum.

8 Claims, 11 Drawing Figures

OLIVE PITTING AND STUFFING MACHINE

CROSS-REFERENCE TO RELATED APPLICATIONS

This application is a continuation-in-part of application Ser. No. 701,942 filed July 1, 1976 and now abandoned and is related to application Ser. No. 567,811 filed Apr. 15, 1975.

FIELD OF THE INVENTION

The present invention relates to an olive pitting and stuffing machine and, more particularly, to an olive pitting and stuffing machine operable with greater reliability and speed than existing apparatus for the same purpose.

BACKGROUND OF THE INVENTION

As described in the aforementioned applications and as well known in the art, the preparation of so-called "stuffed" olives involves the removal of the olive pit or stone with a minimum of damage to the meat of the olive and its replacement by a stuffing which can consist of a folded piece of pimento paste or other material such that the rounded or bight portion of this piece forms a substantially flush end to the olive.

To prevent damage to the large end of the olive by the expulsion of the pit therethrough, it is also known to partially core this end or cut out a generally circular portion of the olive meat sufficient to clear the pit which can be driven out of this end by a thin plunger inserted axially into the narrow end of the olive while the latter is held in place. Once the pit is expelled, a previously cut portion of the pimento paste can be introduced, thereby forming the pimento-stuffed olive. The slight incision made at the small end of the olive is scarcely noticeable and the open end is closed by the smooth bight of the pimento paste.

A variety of machines have been provided for pitting and stuffing olives, gnerally using the aforedescribed sequence of operations and almost invariable holding either the olive or the tools in a fixed position during each individual operation. As a consequence the rate at which olives can be pitted and stuffed by the prior-art system is limited.

In the aforementioned copending applications, however, I have described various improvements over the state of the art which permit a substantial increase in the rate at which olives can be pitted and stuffed and, as well, improvements in the reliability of the machines so that they are less prone to breakdown and interruption of the production process.

OBJECTS OF THE INVENTION

It is the principle object of the present invention to provide an apparatus for pitting and stuffing olives which extends the principles set forth in my earlier copending applications mentioned above and obviates the disadvantages of the prior art.

Another object of the invention is to provide a high speed, reliable and compact olive-pitting and stuffing machine.

SUMMARY OF THE INVENTION

These objects and others which become apparent hereinafter are attained, in accordance with the invention, in an apparatus for the pitting and stuffing of olives which continuously extrains each olive along an arc-segmental path about an axis and performs the successive operations involved in pitting and stuffing the olive during the continuous rotation of the olive and without interrupting this continuous movement from the point at which the olive is entrained along its arcuate path to the point at which it is discharged from the apparatus.

According to an important feature of the invention, a preferably horizontal drum is rotatable about a fixed axis and is provided with a multiplicity of pairs of successive operable juxtaposed tubular clamping members, the pairs of such members being angularly spaced about the axis of the drum and being each designed to grip a respective olive between them with the longitudinal axis of the olive generally aligned with the axes of these clamping members of jaws. Each pair of clamping members thus constitutes a clamping means for retaining a respective olive during its angular displacement along the arcuate path between an olive-engaging position, preferably located at the top of the path, and an olive-discharge position which can be located in excess of 180° from the engaging position in the travel arc of the clamping means.

The drum also comprises a respective tubular cutting member which can be shifted axially to pierce the large end of the olive through a respective clamping member so as to cut out a circular portion of the olive meat at this end and allow the ejection, through the cutting member of the olive pit. There is one such member associated with each clamping means and continuously in axial alignment therewith on the drum so that this member also rotates together with the remainder of the drum about the aforementioned axis.

According to another feature of the invention, each clamping means is also associated and in axial alignment with a plunger adapted to enter the olive from its narrow end to push out the olive pit in an axial direction, this plunger member being likewise rotatable as part of the drum.

All of the members associated with a given clamping means form an olive-processing station on the drum which is continuously rotatable, each of the members of each station being displaceable axially in accordance with a predetermined program, corresponding to the angular position of the drum by respective fixed cams which may be of the slave type and can have outwardly open peripheral grooves in which the cam follower of a respective rod controlling each member is received.

According to another feature of the invention, there is associated with the drum and synchronized therewith a belt feeder for the pimento paste, the latter being fed toward the drum preferably at a point approximately 90° offset from the olive-engaging point in the direction of rotation of the drum which is equipped with respective cutters, each assigned to one of the stations and adapted to sever a sliver of the pimento paste from the strip thereof advanced by the conveyor.

Advantageously, the drum is provided with respective pockets adapted to grip each sliver and fold the same generally into a U-configuration during continued rotation of the drum, the resulting U-shaped pimento stuffing being thereupon inserted through the clamping member at the broad end of the olive by an insertion member which is displaceable parallel to the axis of rotation of the drum by another cam and forms part of the respective olive-processing station on the drum.

According to yet another feature of the invention, the olives are fed to the drum in succession and in proper orientation and alignment by a chain feeder which meets the drum generally tangentially and which is advanced, until the olive is gripped by the clamping members, at the same peripheral speed and in the same direction as the periphery of the drum at which the olive is engaged. Thus, the drum need not be stopped even while an olive is being carried into the position in which it will be engaged by the gripping or clamping members. The chain may lead from an olive supply and guide disk and a hopper, the disk together with an associated chain performing the olive-orienting function and enabling the olives to be positioned in respective seats of the feed chain in the proper orientation with respect to broad and narrow ends.

Still another feature of the invention resides in the fact that at least one of the clamping or gripping members is resiliently mounted on its rod so that a slight spring pressure is available to compensate for differences in the sizes of the olives.

Advantageously, between the olive-engaging position and the pimento-stuffing position, i.e. at a location less than 90° angularly offset from the engaging position, along the path of the olive, there is positioned a chute or like means for carrying off the pits which have been ejected from the olives. This chute can lead downwardly onto a conveyor which can run generally parallel to the axis of the machine for carrying off the olive pits. At the opposite side of the machine and at a location more than 180° offset from the engaging position, there can be provided a guide for leading the stuffed olives onto another conveyor which discharges the olives.

BRIEF DESCRIPTION OF THE DRAWING

The above and other objects, features and advantages of the present invention will become more readily apparent from the following description, reference being made to the accompanying drawing in which.

SPECIFIC DESCRIPTION

The machine according to the invention comprises a hollow base 44 mounted upon pedestals 37 and receiving the drive motor 205 which is affixed to a plate 74 pivoted at 76 in a pair of trunnions 77 bolted to an inwardly turned flange 45a of the upper housing 45 which rests upon an inwardly turned flange 44a of the lower housing or base 44. The upper housing 45 is provided with a window 45b which can be closed by a cover 203 and which affords access to the interior of the housing.

A handwheel 208 extending through the wall of the other housing 45 has a spindle 208a engaging a nut 80 which is affixed to an arm 79 of the motor platform 74 to facilitate tightening and loosening the belt 206 connecting the pulley 204 of this motor with the pulley 43 of a speed-reducing gear 207 fixed in the upper housing 45.

The reducing gear 207 has a pedestal 207a by which it is bolted to a support plate 46 for the drum.

Mounted on the support plate 46 are a pair of trunnions 117 in which a shaft 1 is fixed, e.g. by a cap screw 117a, this shaft defining a horizontal axis A.

The drum, represented at D is rotatable about the axis A and is normally closed by a pair of removable hoods 192, 194, having an opening 193 between them through which the olive-feed chain passes.

The drum is provided with an externally toothed ring gear 6 which is bolted to a support and guide plate 5 and meshes with a pinion 38 passing through a slot 46a in plate 46. The latter closes the window 46b at the top of the housing part 45.

Figure 3:
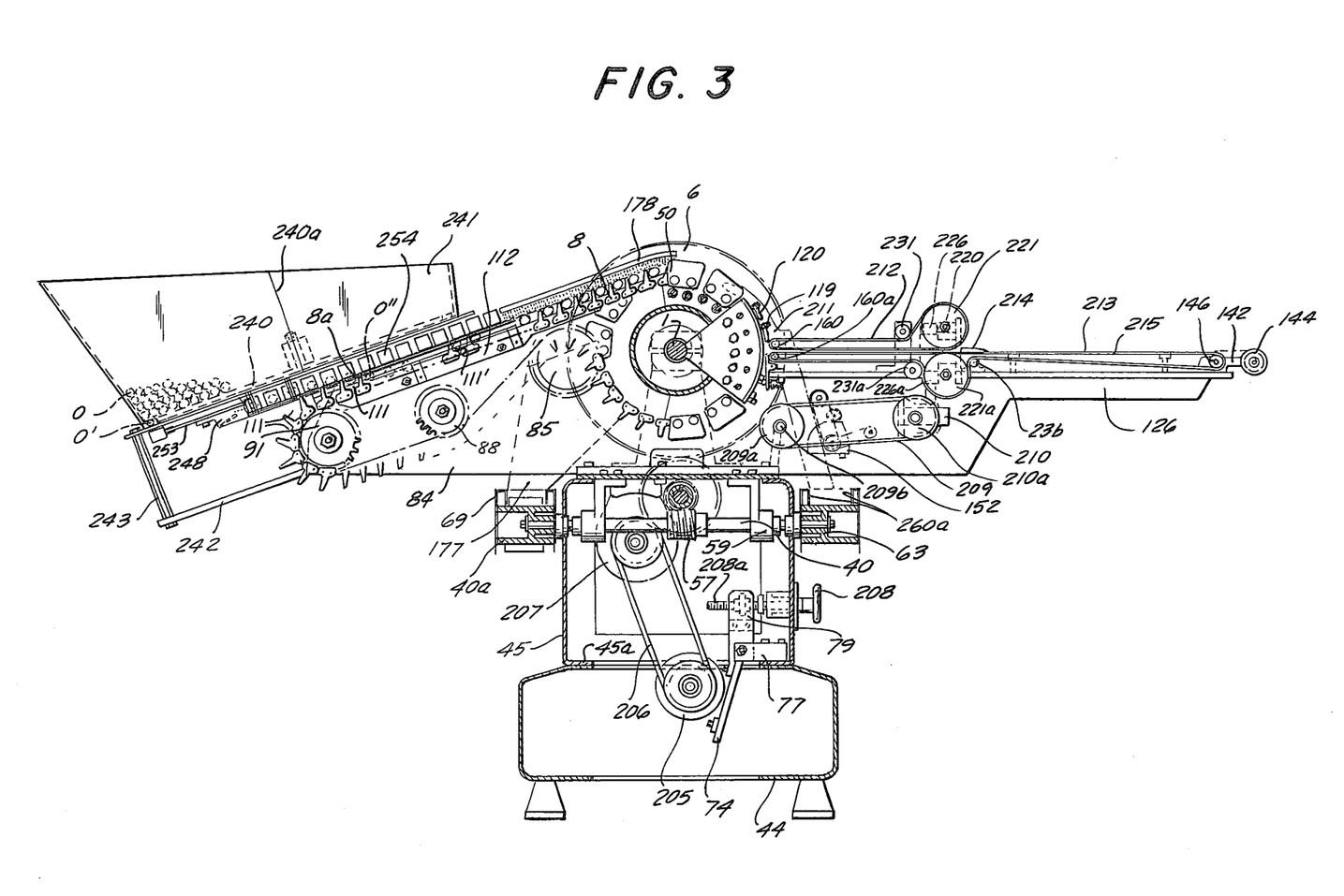
FIG. 3 is a transverse cross-sectional view taken generally along the line III — III of FIG. 1 with certain parts being shown diagrammatically and others broken away.

The plate 46 also carries a pair of journal blocks 46c and 46d in which a shaft 38a is rotatably mounted. The pinion 38 is keyed to the shaft 38a which also carries a worm 57a keyed thereto and meshing with a worm wheel 57 (FIG. 3). Pinion 38 is driven by the output gear 42 of the speed reducer 207.

The worm wheel 57 is keyed to a shaft 40 journaled in a pair of trunnions 59 and carrying at one of its opposite ends a drive roller 63 for a conveyor belt 260 adapted to carry off the pits which are guided into it, between stationary rails 260a by a chute 211. At its other end the shaft 40 carries the roller 40a of a conveyor belt 261 having flights 261a for entraining the olives out of the machine between a pair of rails 69. The olives are led onto this conveyor belt by a chute 177.

Thus, the motor 205 drives the speed reducer 207 via the belt 206, the output gear 42 of the speed reducer drives the ring gear 6 and the drum D via the direction-change gear 38, and the direction change gear 38 drives the conveyor belts 260 and 261 via the worm and worm wheel arrangement 57, 57a.

The drum D comprises a hub 2 journaled by a bearing 3 and a bearing 4 on the fixed shaft 1 and carrying, in addition to the support disk 5, a further support disk 21 and an integral support flange 2a. Axially spaced from the hub and fixed to the shaft is a gripper member cam 32 provided with a peripheral track 32a in the form of a groove engaged by rollers 23a of rods 23 which extend through axial bushings 22 in the flange 2a. The rods 23 carry holders 50 for respective gripper members 54 engageable with the large ends of the olives. As can be seen from FIG. 10, the gripper member 54 is tubular and has an axially extending passage 54a terminating in a conical portion 54b adapted to seat against the large end of the olive. At its opposite extremity, a conical mouth 54c is formed to ensure alignment of the cutter with the bore 54a. A flange 54d and a snap ring 54e anchor the gripper member 54 in a seat 50a formed in the holder 50. As can best be seen from FIG. 2, each holder 50 carries a pair of grippers 54 so that, in the preferred embodiment of the invention, each olive-engaging station is paired with another and two olives are operated upon simultaneously in accordance with the sequence of operations to be carried out at each of the drum stations.

Figure 10:
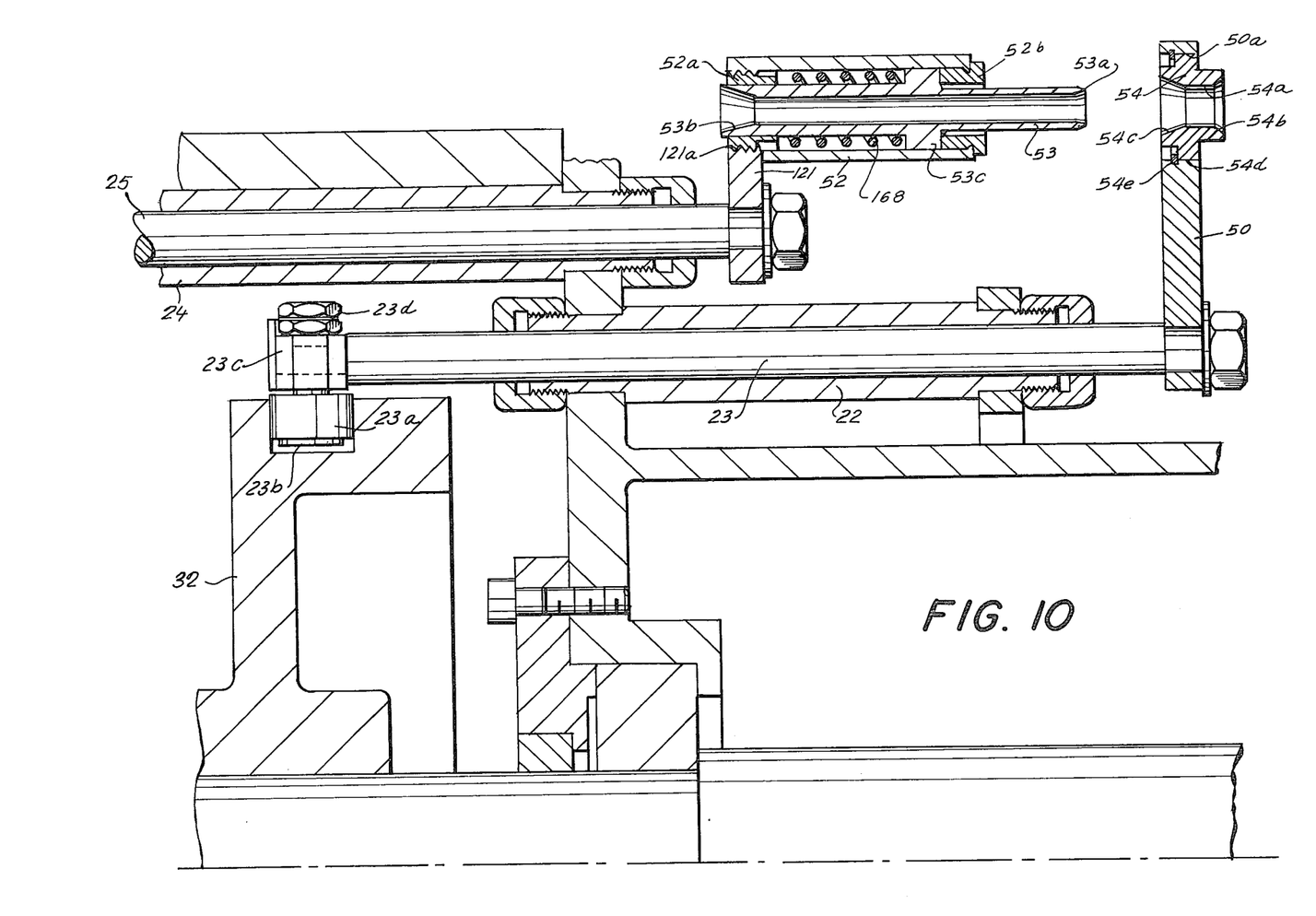
FIG. 10 is a detail view showing, in cross-section, the other gripping jaw and the cutting member cooperating therewith in a withdrawn position.
Figure 11:
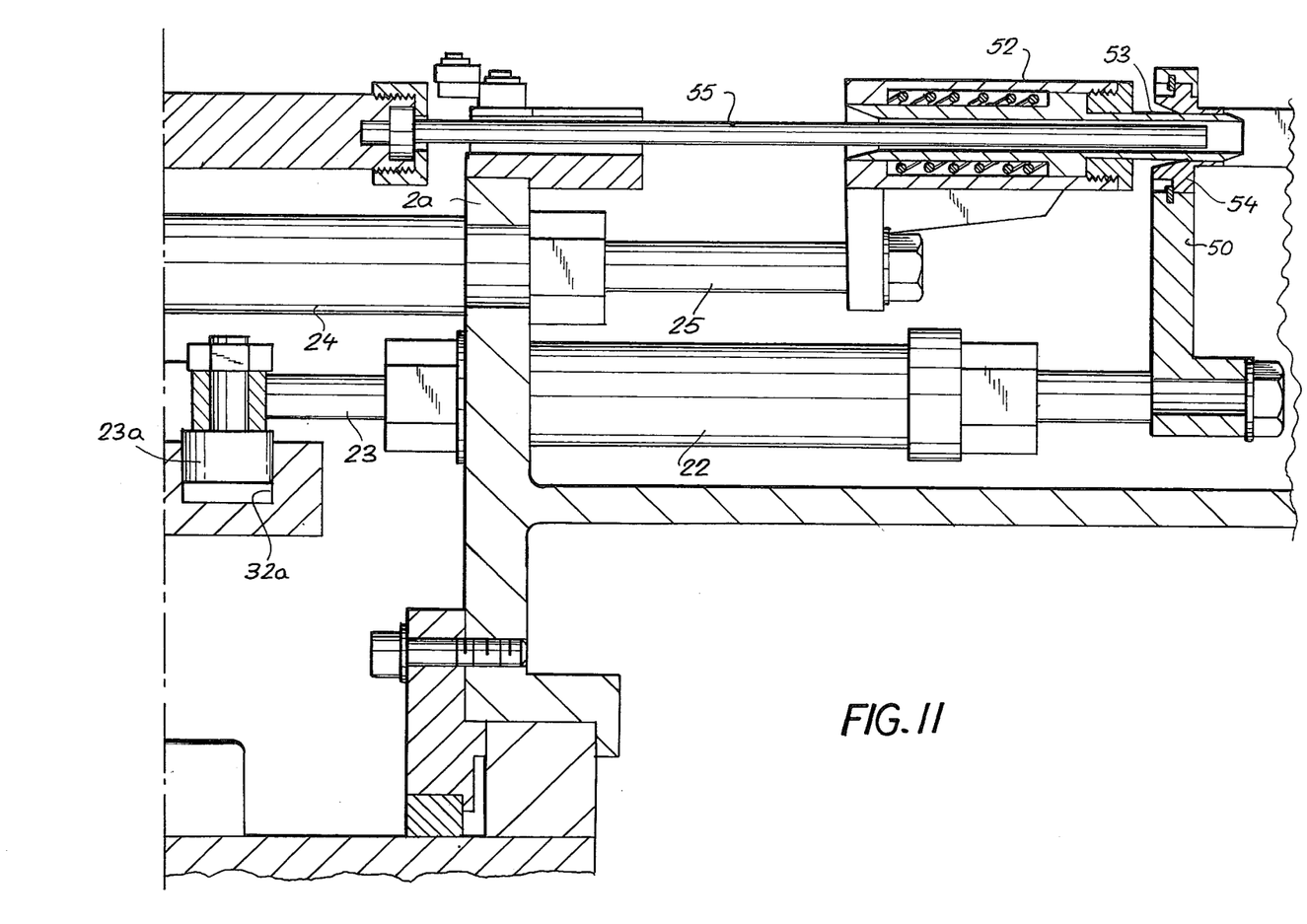
FIG. 11 is another detail cross-sectional view showing the cutting member inserted into its gripping member and the pimento-inserting plunger extending therein.

The fixed shaft 1 also carries a fixed cutter cam 33 which can be attached to the shaft by a set screw 33b similar to the set screw 32b anchoring the cam 32 to shaft 1. The cam 33 is formed with a circumferential groove 33a which engages the cam-follower rollers 18 actuating rods 25 which are guided in sleeves 24 anchored to the flange 2a. The sleeves 24 carry a ring 26 to which further sleeves 27 are affixed. The rods 25 extend parallel to the axis A and at their extremities remote from the rollers 18 are formed with holders 121 for sleeves 52 (see FIG. 10) which carry the cutters 53. The cutters 53 have a mouth 53a formed as an annular cutting edge and are designed to core the large end of the olive and thereby form a tubular passage therein around the olive pit. The cutter 53 is also open at its opposite end 53b to accommodate a feeding member or rod 55 adapted to dislodge a pit P removed from an olive O from the interior of the coring cutter 53. The coring cutter 53 is formed with an annular flange 53c against which a coil spring 168 bears. The spring is seated against a bushing 52a threaded into the sleeve 52 and formed with an external thread enabling the sleeve 52 to be threaded into a bore 121a of the holder 121. Another threaded bushing 52b closes the opposite end of the sleeve 52 and forms a stop for the cutter 53 in its extreme right-hand position as illustrated in FIG. 10. The feeding rod 55 also serves to advance the silver of pimento paste into the aperture formed in the olive.

Figure 1:
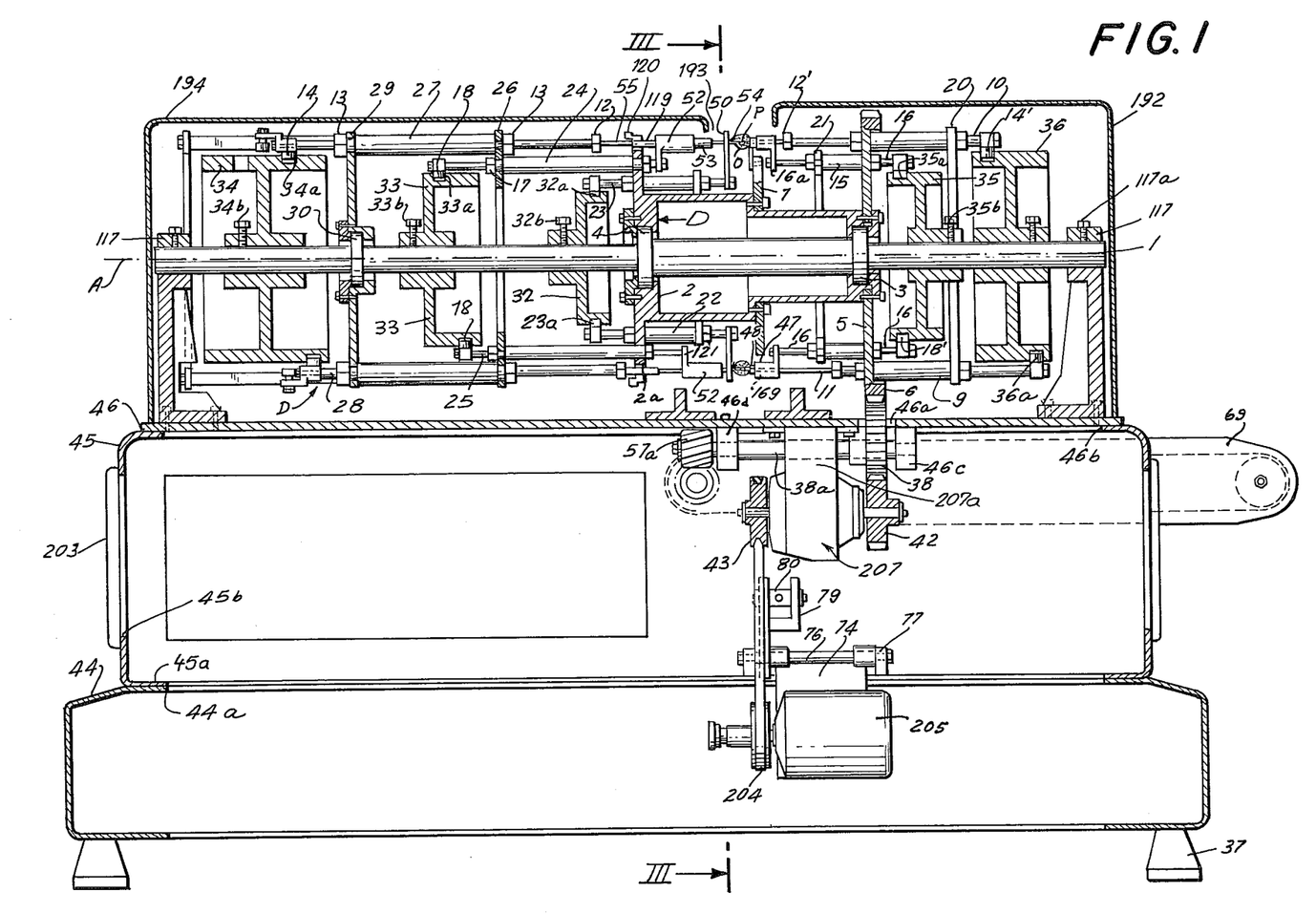
FIG. 1 is a vertical longitudinal cross-section through the apparatus of the present invention with certain parts shown in elevation, other parts broken away for clarity and only the upper and lower olive-processing stations of the drum illustrated.

Referring again to FIG. 1, it will be seen that the flange 2a also carries a cutting blade 120 to be described in greater detail below and adapted to sever the slivers of pimento from the continuous strand advanced by the pimento conveyor.

The shaft 1 also supports, via a bearing 30, a disk 29 to which the left-hand ends of the guide tubes 27 are anchored.

A drum-shaped feed cam 34 is fixed by a set screw 34b to the shaft 1 and is formed with a closed peripheral groove 34a forming a track for the rollers 14 which are connected with axially extending rods 28 running through the sleeves 27 and coupled at 12 to the feed rods 55 mentioned previously. The ring 26 at the right-hand ends of the tube or sleeves 27 is provided with slide bearings 13, a similar slide bearing arrangement being provided at the disk 29 for the rods 28.

On the other side of the olive a gripper 48 at each station is mounted axially slidably in a sleeve 47 and is urged to the left by a spring 169, the sleeve 47 being mounted on a holder 16a carried by a respective axially extending rod 16. As will be apparent from FIG. 9, each rod 16 has a threaded end on which a nut 16b retains the holding plate 16a against a shoulder 16c. The holding plate 16a has an internally threaded bore receiving an externally threaded boss 47a of the sleeve 47 enclosing the spring 169. Movement to the left of the gripper 48 is prevented by a bushing 47b threaded into the corresponding end of the sleeve 47. The gripper 48 has a mouth 48a engageable with the small end of the olive, a central bore 48b adapted to pass the pit-ejecting plunger and a conical end 48c serving to guide the plunger into this end of the olive. As shown, the grippers 48 and 54 are juxtapositioned and axially aligned. When the drum D is rotated on the shaft, the grippers 48 and 54 orbit concentrically thereabout. As will subsequently become apparent, and as shown in FIG. 3, the chain delivers olives O to the gripper members tangentially to said orbit.

The sleeves 15 in which the rods 16 are guided are mounted upon the disk 5 mentioned previously and carry a reinforcing ring 21 joining the free ends of these sleeves together for stiffness. The rods 16 have their follower rollers 18' guided in closed tracks 35a of a cam 35 fixed by the screw 35b to the shaft 1.

A further piercing plunger cam 36 of similar configuration has a closed peripheral track 36a in which the cam-follower rollers 14' are guided, the cam-follower rollers 14' driving rods 10 to which are connected at 12' the piercing plungers which can be of cruciform cross-section. The plungers 11 are pointed at their left-hand extremities, are intended to pierce the narrow end of the olive and drive out the pit P as will be described in greater detail below.

The rods 10 are guided in sleeves 9 which are anchored to the disk 5 at one end and have their free extremities joined by a ring 20 for rigidity.

Figure 9:
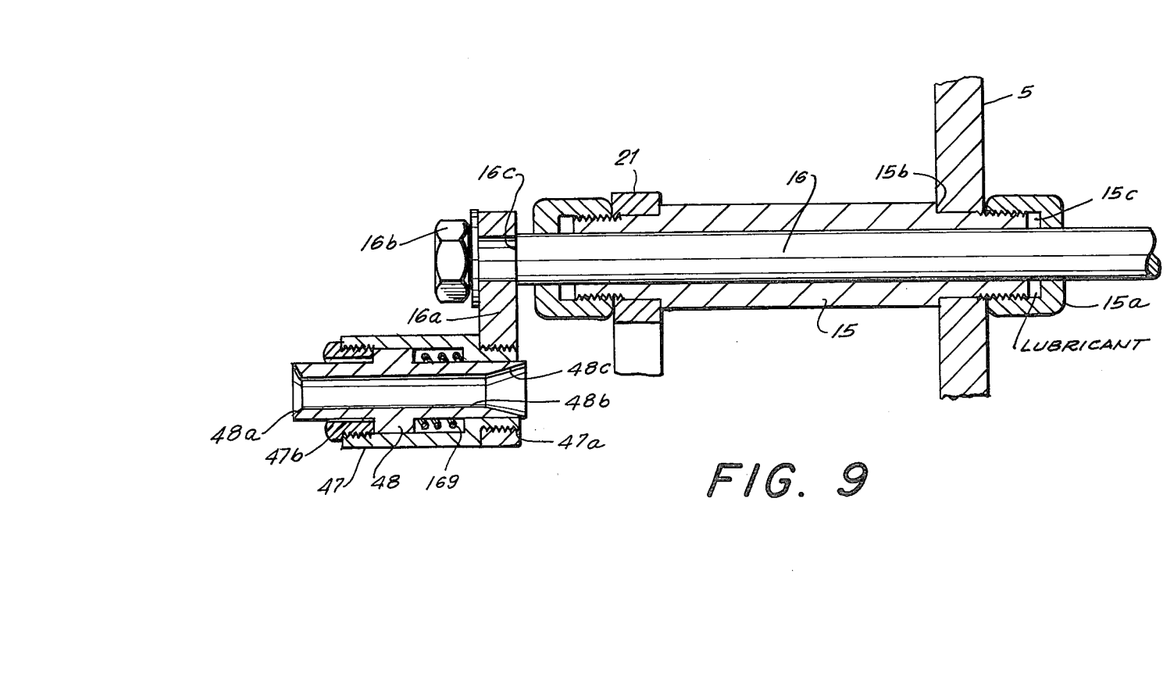
FIG. 9 is a vertical cross-sectional view representing a detail of one of the clamping or gripping members engageable with the olive.

In all cases, at each end of the guide sleeve, the slide bearing can comprise, as shown in FIG. 9, a packing nut 15a which is threaded onto an extremity of the sleeve 15 and serves to clamp the disk, ring or flange, e.g. the disk 5, against a shoulder 15b. The packing nut 15a can define a lubricant filled space 15c surrounding the rod 16.

For each of the cam-follower rollers, e.g. as shown for the roller 23a in FIG. 10, there is provided a shaft 23b which can be mounted upon a sleeve 23c receiving the rod 23 and locked thereto by a screw extending radially of the rod and represented by the head 23d. Alternatively the sleeve can be clamped against the shoulder of the rod via a nut similar to that represented at 16b in FIG. 9.

Figure 2:
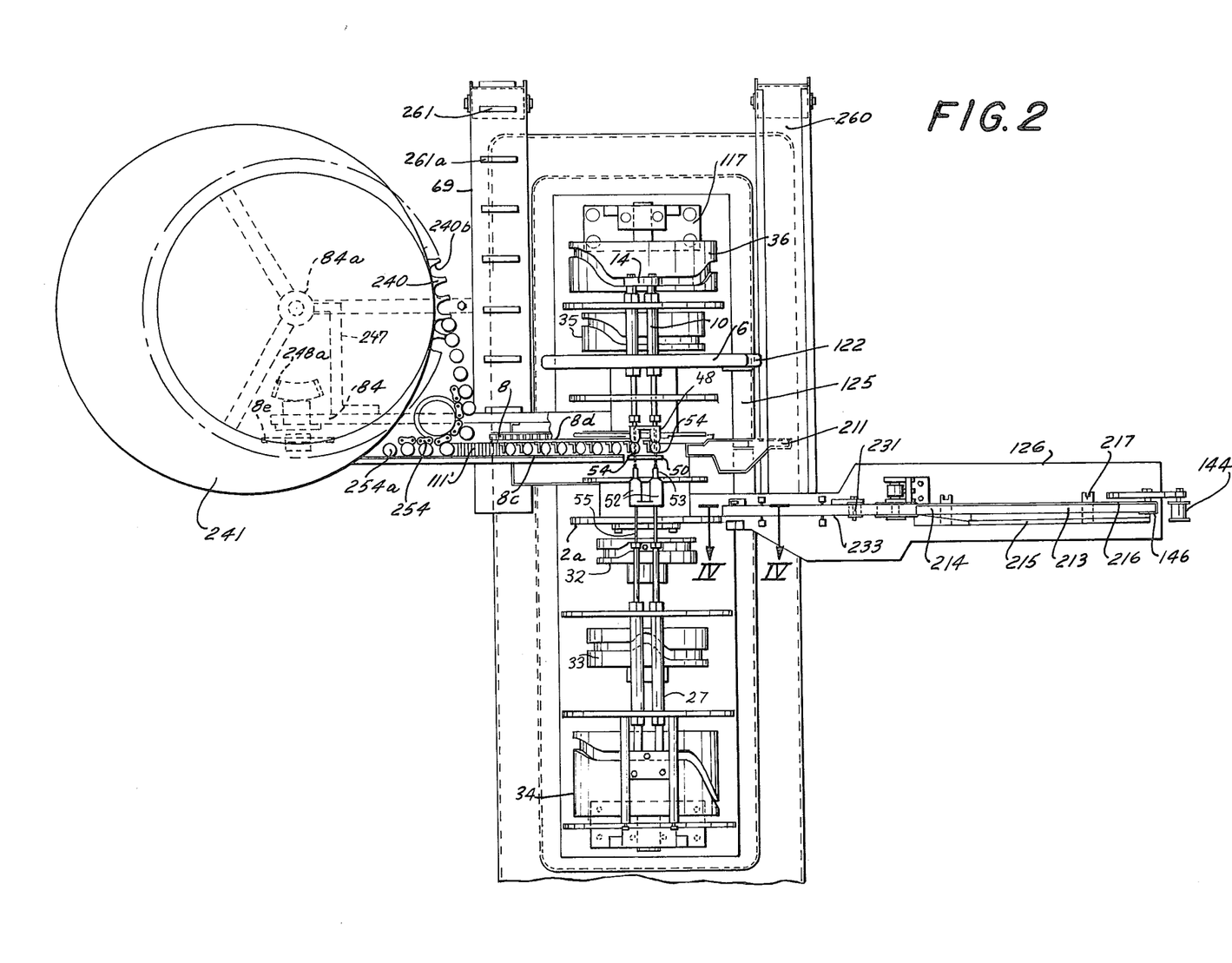
FIG. 2 is a top plan view of the machine with the drum covers removed and parts broken away.

As shown in FIGS. 2 and 3 the olive-feeding and orientation device comprises a hopper 241 mounted on a lateral arm 84 of the machine and formed along its bottom with a disk 240 rotatable about an axis 240a. The disk 240 is inclined to the horizontal and lies substantially in a plane tangent to the drum D. Along its periphery, the disk 240 is formed with a multiplicity of angularly spaced pockets 240b adapted to receive the individual olive O as shown for the olive O' in FIG. 3. When the pockets 240b are aligned with cups of a chain 254 extending over substantially 270° of the arc of the disk therebelow, the olives are caused to fall with their large ends downwardly into these cups and are carried tangentially away from the disk over the lower stretch 254a of the chain.

The disk is rotatable in a hub 84a carried by a lateral arm 247 bolted to the arm 84. On its underside, the disk is formed with a beveled ring gear 248 which meshes with a pinion 248a driven by a chain 8 via a sprocket wheel 8e whose shaft is journaled in the arm 84 and carries the pinion 248a. The chain 8 is synchronized with the drum D by passing over the sprocket teeth 8b formed at the outer end of the disk 7. This synchronizes the chain 8, the disk 240 and the chain 254 (which is engaged by and passes around the sprocket 253 of the disk 240) for joint and synchronous rotation.

The chain 8 passes over a sprocket wheel 91 journaled on the arm 84 which can have a pair of supports 242 and respective posts 243 reaching into the hub 84a.

A deflection sprocket 88 is also provided for the chain which passes over the exterior of still another sprocket wheel 85 designed to limit the angle of the drum occupied by the chain arrangement.

A support 112 is provided for the stretch of chain 8 between the point at which it meets the drum at the sprocket wheel 7 thereof and the sprocket wheel 91. After subtending the drum, the chain 8 returns over the wheel 85 and wheel 88 to the sprocket wheel 91.

The chain 8 is formed with links each of which has an upstanding finger 8a, the fingers defining pockets 111 between them to receive the olives which drop into the pockets as shown at O″ and are held in an oriented position as they roll along the surface 111′ of the guide 112. During travel along the feed path, the olives are laterally guided between walls 8c and 8d flanking the chain.

As can be seen in FIG. 2, the olives are continuously advanced onto the drum D where they may be clamped between gripper members 54 and 48. A smooth brush 178 engages the olives from above to prevent them from jumping out of the pockets 111.

The apparatus is designed to fill the pitted olive with a so-called "stuffing" usually of a pimento paste but possibly of some other material. In accordance with the present invention, the stuffing material formed into a strip of paste, is fed continuously to the drum along the side thereof opposite that at which the olive feeding device 240 etc. is provided. The paste feeding device comprises an upper belt 212 driven by a roller 221 whose worm wheel 220 meshes with a worm gear 226 driven by the speed-reducing drive 210 whose pulley 210a is connected by a belt 209 with a pulley 209a. A belt tightening arrangement is represented at 152 for these belts. The pulley 209a is driven by a shaft 209b carrying the gear 122 which meshes with the toothed wheel 6. Thus, the belt 212 is synchronized with the drum D. The belt 212 passes over a guide roller 160 at its discharge end and under a tensioning and deflecting roller 231 at a point proximal to the drive roller 221. Rollers 160 and 231 are journaled upon an arm 126 which extends horizontally from the machine housing substantially in the plane of the disc-like flange 2a.

The arm 126 also carries a drive roller 221a driven by another worm gear 226a from the speed reducer 210. A belt 213 passes over this roller 221a, around a roller 160a at the discharge end at the past-feed device, around a further roller 146 at the opposite end of the arm and under a pair of guide rollers 231a and 231b. The roller 146 may be journaled on a support 142 (see FIG. 2) of the arm 126 which can also carry a wider roller 144 for use when a larger belt is employed.

The belt 213 passes over a support surface 215 upon which the strip of pimento paste can be placed, thereby carrying the pimento paste between the flanks of a folding guide 214 which folds this strip into a U-cross-section or channel-shaped body as it passes beneath the belt 212. A U-shaped band of the pimento paste is thus advanced synchronously with the rotation of the drum through a slot 166a (see FIG. 4) as will be described in greater detail below. The support surface 215 is bounded by a lateral wall 216 so that the oncoming strip of pimento paste can be correctly positioned for folding, both the table 215 and the rail 216 being removably mounted on supports 217. A pair of guide rails 233 flank the stretches of the belts which advance the folded pimento paste to prevent the latter from slipping laterally.

The slot 166a (FIG. 4) is formed in a mouthpiece 166 which is fulcrumed at 159 to support members 167 which are mounted on the arm 126, so that the surface 166b which cooperates with the cutting blades 120 can be moved toward and away from the surface of the drum D. To this end, the arm 166c of member 166 is provided with a threaded rod 166f which passes through a sleeve 235 carrying a post 235a to which a coil spring 201 is anchored, the other end of this tension spring engaging the arm 166c. Thus, the arm 166c is normally drawn in the direction of arrow 166d but displacement in this direction is limited by a nut 166e on the rod 166f. The blades 120 are pivotally mounted on 120a on supports 119 of the flange 2a and are adapted to swing about radii of the drum during the cutting process to sever U-shaped slivers of the pimento paste which are engaged in pockets 120b aligned with the respective cutting members 53 so that the pimento paste can be advanced by the rod 55 into the olive aligned with the cutter 43 and, indeed, enclosing the opposite end thereof.

Essentially, the sequence of operation of the device is as follows:
(a) The olives are advanced by the chain 8 tangentially to the drum D and, in pairs, are gripped each between a gripping member 54 and a gripping member 48, the two forming a pair assigned to a gripping means and olive processing station of the drum.
(b) While so gripped, an end of each olive is pierced by a respective cutter 53 and cored.
(c) The respective ejection plunger 11 then pierces the opposite end of the olive and drives the pit out of the latter, the pit falling into the trough 211 and being carried away.
(d) While the olive remains gripped, a U-shaped sliver of pimento paste is severed from the continuously advanced strand and is aligned with the tubular cutter 53 and the olive.
(e) The plunger 55 presses the pimento stuffing into place.
(f) The grippers are retracted and the olive is permitted to fall through 177 to be carried away.

Figure 7:
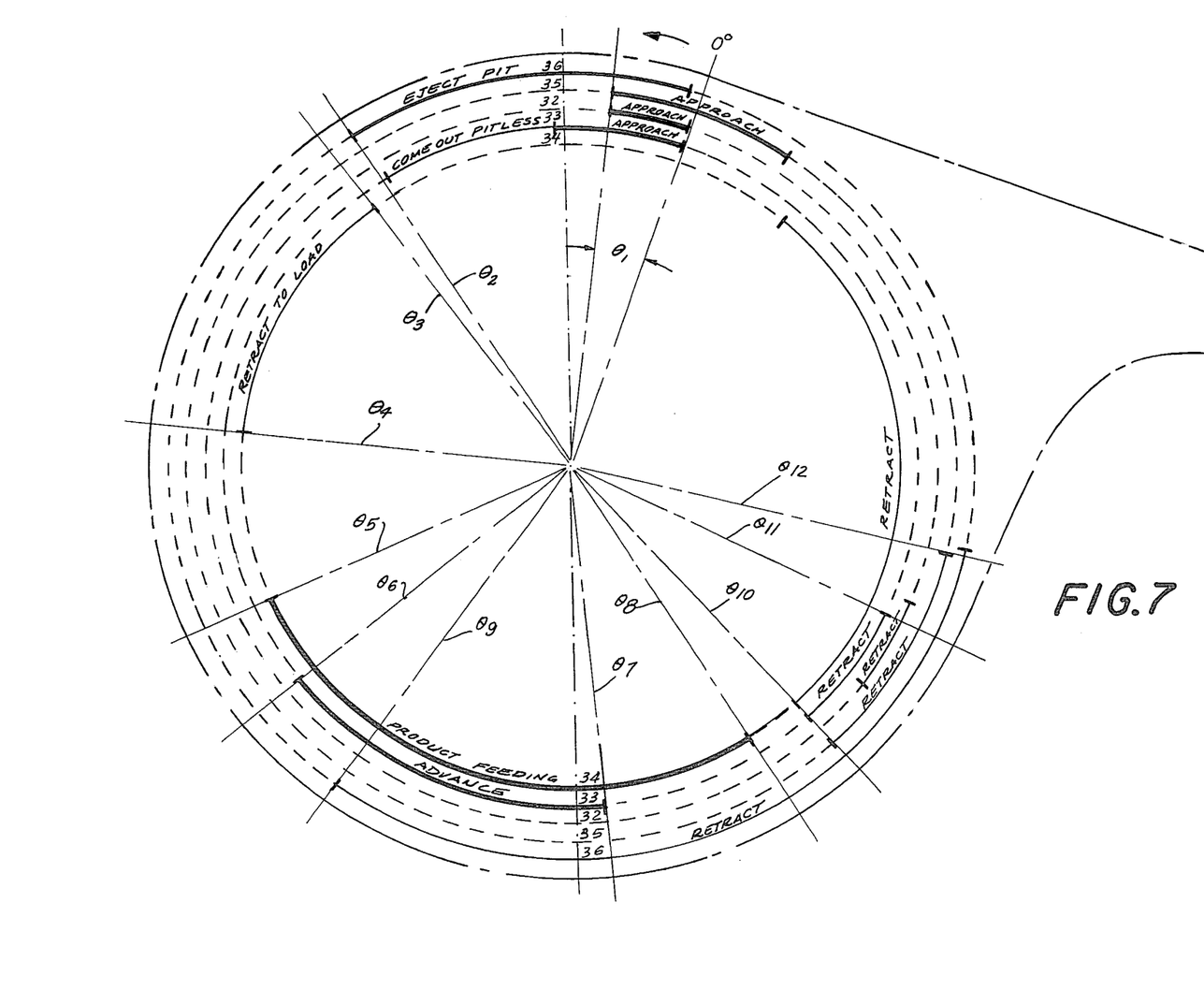
FIG. 7 is a timing diagram relating the operation of the cams to the angular position of the drum.
Figure 8:
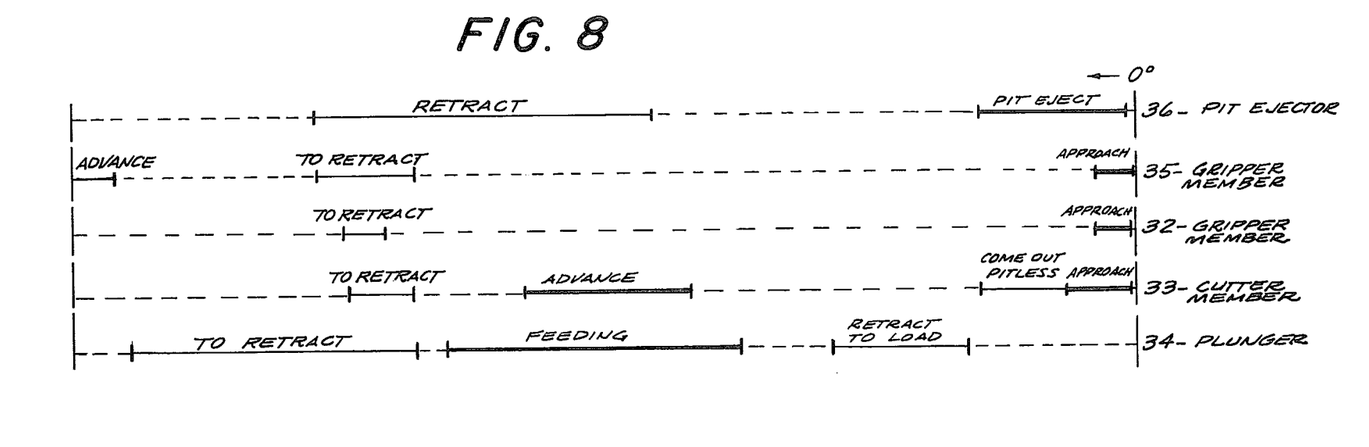
FIG. 8 is a corresponding timing diagram in developed view.

Each of steps (a) – (f) is carried out without interrupting the rotation of the drum and continuously through the intermediary of the cams 32 – 36. Thus, the cams 32 and 35 advance the gripper members as represented over the arc $\theta_1$ from the starting position until the olive is gripped. Practically concurrently and until a point $\theta_2$ the cam 23 operates the cutter for opening the broad end of the olive. The cam 36 during this period advances the ejector plunger 11. At point $\theta_3$ in the path of the drum, cam 34 retracts the rod 55 to enable the pimento paste to be fed into the cutter 53, the retraction terminating at a point $\theta_4$. Between $\theta_4$ and $\theta_5$, the pimento sliver is aligned with the olive and at $\theta_5$ cam 34 again advances to set the pimento. As the pimento sliver is advanced, cam 33 at point $\theta_6$ begins to advance the cutter together with the plunger 55 so that the pimento is guided fully into the interior, the cutter terminating its motion at $\theta_7$ so that the continued movement of rod 55 between $\theta_7$ and $\theta_8$ corresponds to the setting of the pimento. The cam 36, meanwhile (at $\theta_9$) begins retraction of the interior plunger and at $\theta_{10}$, retraction of rod 55 and cutter 53 begin. The cutter is fully retracted at $\theta_{11}$ and between $\theta_{10}$ and $\theta_{12}$ the gripper member releases the olive which falls through its chute onto its conveyor.

I claim:

1. In a pitting and stuffing machine for olives and the like, a pair of juxtaposed gripper members having aligned central passageways circumscribed by frusto-conical olive engaging surfaces defining an olive receiving chamber therebetween; powered means mounting said members for movement toward and from each other to grasp and to release olives therebetween; an elongated tubular cutter; means mounting the cutter for longitudinal reciprocal movement to and from the chamber through a passageway of a member to core an olive therein and to retract from the chamber; an elongated pitting plunger; means mounting the pitting plunger for reciprocal movement to and from the chamber through the passageway of the member opposite to the cutter in substantial alignment therewith; an elongated feed plunger; means mounting the feed plunger for longitudinal reciprocal movement into and out of the cutter coaxially thereof; means for positioning stuffing material in alignment with the cutter when the feed plunger is retracted therefrom; and means sequentially moving the gripper members toward each other to grasp an olive therebetween, thrusting the cutter into the chamber to core an olive held therein and retracting therefrom, thrusting the pitting plunger into the chamber to eject the pit from the olive therein in the direction of the cutter as the cutter is retracted, moving the feed plunger relative to the retracting cutter and in the opposite direction to eject olive core therefrom, concurrently retracting the feed plunger from the cutter to receive stuffing materials therebetween, the pitting plunger from the chamber and re-inserting the cutter into the olive in the chamber, subsequently thrusting the feed plunger into the cutter for the delivery therethrough of stuffing material into the olive, and concurrently retracting the feed plunger from the cutter, the cutter from the chamber and separating the gripper members to release the stuffed olive.

2. The machine of claim 1 including resilient means mounting one of said gripper members on its powered means for resilient movement toward and from the other member whereby olives of different sizes can be grasped between said frusto-conical surfaces.

3. An olive pitting and stuffing machine comprising
(A) a central shaft;
(B) means mounting the shaft in fixed position;
(C) a drum mounted for rotation on the shaft;
(D) a plurality of pairs of juxtaposed gripper members mounted on the drum for rotation therewith, the gripper members of each pair having axially aligned passageways circumscribed by frusto-conical olive engaging surfaces defining an olive receiving chamber therebetween;
(E) means mounting the gripper members on the drum for rotation therewith axially parallel to the shaft and for axial movement of the members of each pair relatively toward and from each other;
(F) a circular gripper cam mounted concentrically in fixed position on the shaft;
(G) followers individual to the pairs of gripper members engaged with the gripper cam and connected to their respective gripper members to urge the members of each pair relatively toward each other at a predetermined receiving station to grasp olives therebetween and relatively from each other at a predetermined releasing station to release such olives, the followers being laterally offset from the axes of the passageways to leave the passageways substantially unobstructed;
(H) means for delivering olives successively to the receiving station;
(I) elongated pitting plungers individual to the pairs of gripper members;
(J) means mounting the pitting plungers on the drum for rotation therewith and for longitudinal reciprocal movement to and from the chambers of their respective pairs of gripper members coaxially of the passageways thereof;
(K) a circular pitting cam mounted concentrically is fixed position on the shaft;
(L) pitting followers individual to the pitting plungers engaged with the pitting cam and connected to their respecive pitting plungers to reciprocate the pitting plungers to and from the chambers of their respective pairs of gripper members;
(M) elongated tubular cutters individual to the pairs of gripper members;
(N) means mounting the cutters on the drum for rotation therewith and for longitudinal reciprocal movement to and from the chambers of their respective pairs of gripper members coaxially of the passageways thereof;
(O) a circular cutter cam mounted concentrically in fixed position on the shaft;
(P) cutter followers individual to the cutters engaged with the cutter cam and connected to their respective cutters to reciprocate the cutters to and from the chambers of their respective pairs of gripper members, the cutter followers being laterally offset from the axes of the passageways to leave the tubular cutters substantially unobstructed;
(Q) elongated feed plungers individual to the cutters;
(R) means mounting the feed plungers on the drum for rotation therewith and for longitudinal reciprocal movement to and from their respective cutters coaxially of the passageways;
(S) a circular feed cam mounted concentrically in fixed position on the shaft;
(T) feed plunger followers individual to the feed plungers engaged with the feed cam and connected to their respective plungers to reciprocate the plungers to and from their respective cutters, the plungers having loading positions retracted from their respective cutters in spaced relation thereto and in alignment therewith;
(U) means for supplying stuffing material to positions between the feed plungers and their respective cutters when the feed plungers are in loading positions; and
(V) means for rotating the drum, gripper members, followers, pitting plungers, cutters, and feed plungers on the shaft.

4. The machine of claim 3 in which the cams are shaped and arranged sequentially during such rotation to urge the gripper members toward each other at the receiving station to grasp an olive in the chamber therebetween, to thrust the cutter into the chamber to core the olive therein and to retract therefrom, to thrust the pitting plunger into the chamber to eject the pit from the olive therein in the direction of the cutter as the cutter is retracted, to move the feed plunger relative to the retracting cutter and in the opposite direction to eject the olive core therefrom, concurrently to retract the feed plunger from the cutter to receive stuffing material therbetween, the pitting plunger from the chamber and re-inserting the cutter into the olive in the chamber, subsequently to thrust the feed plunger into the cutter for the delivery therethrough of stuffing material into the olive, and concurrently retracting the feed plunger from the cutter and the cutter from the chamber and to separate the gripper members to release the stuffed olive.

5. The machine of claim 3 in which the passageways of the gripper members are circumscribed by frusto-conical olive engaging surfaces and including resilient means mounting a gripper member of each pair on its respective mounting means for resilient movement toward and from its respective opposite gripper member whereby olives of different sizes can be grasped between the frusto-conical surfaces.

6. The machine of claim 3 in which pairs of circumferentially adjacent gripper members at corresponding ends of the olives are provided in integral relation for unitary movement, and in which the cam followers position the gripper members and their respective cutters and pitting plungers in corresponding circumferentially adjacent pairs.

7. The machine of claim 3 in which pairs of circumferentially adjacent gripper members at corresponding ends of the olives are provided in integral relation for unitary movement, and in which the cam followers position the gripper members and their respective cutters, pitting plungers and feed plungers in corresponding circumferentially adjacent pairs.

8. The machine defined in claim 3 wherein said cams are cylindrical and provide peripheral tracks, and the mounting means for each of said gripper members and said followers are provided with an axially extending rod having a cam-follower roller engageable in a respective one of said tracks.

* * * * *

UNITED STATES PATENT AND TRADEMARK OFFICE
CERTIFICATE OF CORRECTION

PATENT NO. : 4,096,795
DATED : June 27, 1978
INVENTOR(S) : Clemente Del Ser Gonzalez It is certified that error appears in the above-identified patent and that said Letters Patent are hereby corrected as shown below:

Column 1, line 41, delete "invariable" and substitute ---invariably---.
           Line 55, delete "principle" and substitute ---principal---.
           Line 68, delete "extrains" and substitute ---entrains---.

Column 2, line 15, delete "of" and substitute ---or---.

Column 4, line 63, insert between "axial" and "bushings" ---guide---.

Column 5, line 35, delete "silver" and substitute ---sliver---.

Figure 4:
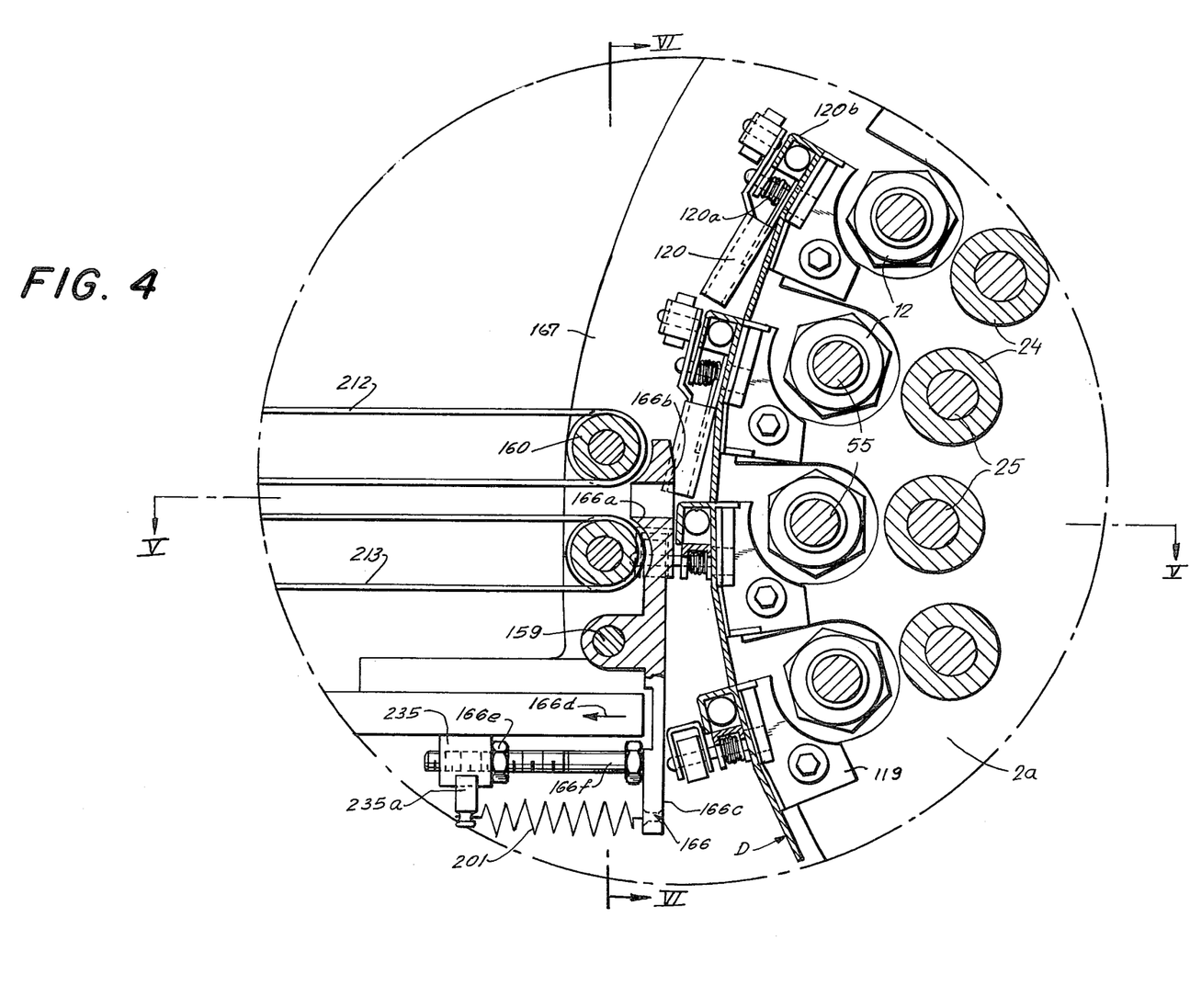
FIG. 4 is a detail view in vertical section of the region represented generally at IV — IV of FIG. 2 illustrating the pimento paste feed and the cutting drums.
Figure 5:
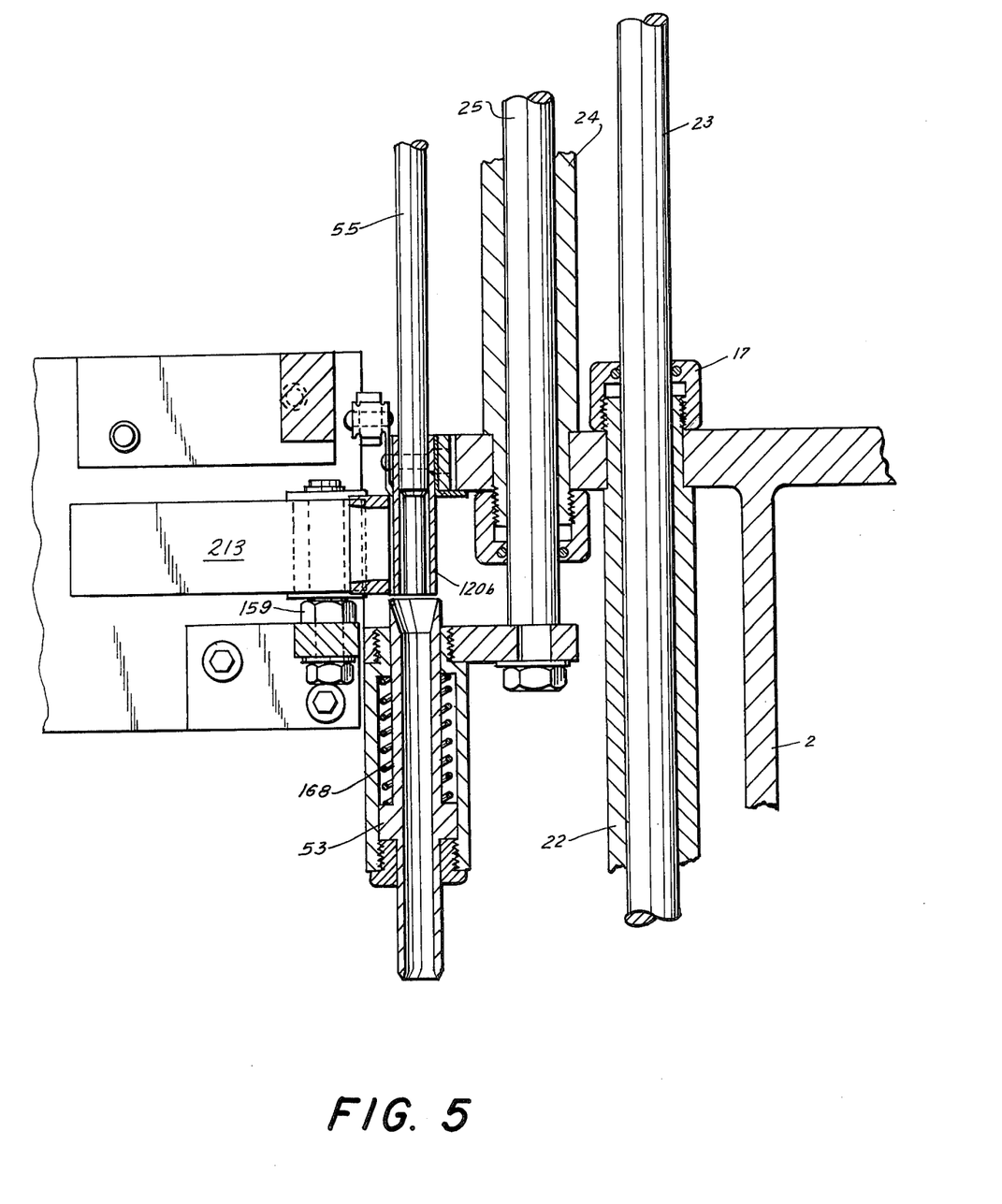
FIG. 5 is a section taken along the line V — V of FIG. 4.
Figure 6:
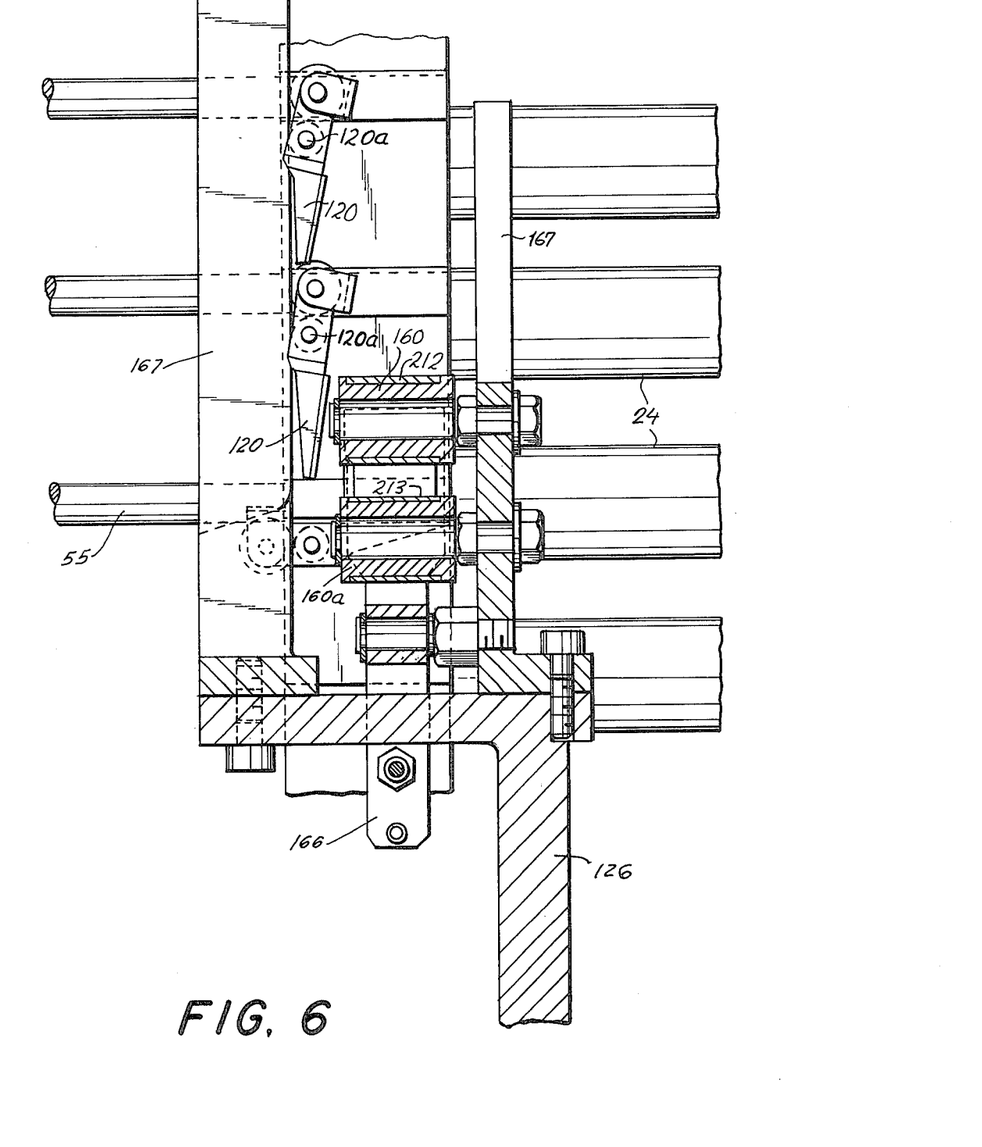
FIG. 6 is a section taken along the line VI — VI of FIG. 4.

Column 7, line 29, delete "The" and substitute ---Referring to FIGS. 2, 3 and 4, the---.

Column 8, line 50, delete "the broad" and substitute ---an---.

Signed and Sealed this

Twentieth Day of February 1979

[SEAL]

Attest:

RUTH C. MASON
*Attesting Officer*

DONALD W. BANNER
*Commissioner of Patents and Trademarks*